(12) United States Patent
Liu et al.

(10) Patent No.: US 7,368,779 B2
(45) Date of Patent: May 6, 2008

(54) HEMI-SPHERICAL STRUCTURE AND METHOD FOR FABRICATING THE SAME

(75) Inventors: Ming-Chyi Liu, Hsinchu (TW); Chi-Hsin Lo, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 120 days.

(21) Appl. No.: 11/324,250

(22) Filed: Jan. 4, 2006

(65) Prior Publication Data
US 2007/0155066 A1    Jul. 5, 2007

(51) Int. Cl.
*H01L 27/108* (2006.01)
*H01L 29/76* (2006.01)
*H01L 29/94* (2006.01)
*H01L 31/119* (2006.01)

(52) U.S. Cl. ............. 257/306; 257/288; 257/760; 257/E21.269; 257/E21.396; 257/E21.421

(58) Field of Classification Search ........ 257/306, 257/288, 432, 639, 640, 701, 759, 760
See application file for complete search history.

(56) References Cited

U.S. PATENT DOCUMENTS

| 5,316,640 | A |   | 5/1994  | Wakabayashi et al. |
| 5,324,623 | A |   | 6/1994  | Tsumori |
| 5,635,037 | A | * | 6/1997  | Chu et al. ............. 204/192.35 |
| 6,251,725 | B1 | * | 6/2001 | Chiou et al. ................ 438/253 |
| 7,163,834 | B2 | * | 1/2007 | Lim ............................ 438/70 |
| 2004/0266096 | A1 | * | 12/2004 | Isobe et al. ................ 438/240 |
| 2005/0074968 | A1 |   | 4/2005 | Chen et al. |

* cited by examiner

*Primary Examiner*—David Nhu
(74) *Attorney, Agent, or Firm*—Birch, Stewart, Kolasch & Birch, LLP

(57) ABSTRACT

Hemi-spherical structure and method for fabricating the same. A device includes discrete pillar regions on a substrate, and a pattern layer on the discrete support structures and the substrate. The pattern layer has hemi-spherical film regions on the discrete support structures respectively, and planarized portions on the substrate between the hemi-spherical film regions. Each of the hemi-spherical film regions in a position corresponding to each of the support structures serves as a hemi-spherical structure.

10 Claims, 6 Drawing Sheets

HEMI-SPHERICAL STRUCTURE AND METHOD FOR FABRICATING THE SAME

TECHNICAL FIELD

The present invention relates to hemi-spherical structures, and particularly to hemi-spherical structures for image device applications and micro-electro-mechanical-system technology and methods for fabricating the same.

BACKGROUND

Microlenses are widely used in various fields including an optical information processing system, an optical communication, an optical pickup, an optical measurement, or solid-sate image devices. Solid-state image devices typically include a photosensor such as a photodiode formed in or on a substrate, a color filter formed over the photosensitive device and a microlens array formed over the color filter. The photosensor may be a photodiode, a CMOS (complimentary metal oxide semiconductor) sensor or a charge-coupled device (CCD), for example. The function of the microlens is to efficiently collect incident light falling within the acceptance cone and refract this light in an image formation process onto a focal plane at a depth defined by the planar array of photodiode elements. In particular, development of more precise and small-sized microlenses is recently accelerated owing to miniaturization, integration and high performance requirements to optical instruments.

One conventional method for manufacturing the microlens uses a thermal process and a blanket etch-back process to form a dielectric layer as a microlens array on a substrate, but has difficulties in controlling uniformity, profile and curvature of the microlenses. FIGS. 1A to 1D show conventional ladder etching process sequences for forming a microlens array. In FIG. 1A, a substrate 10 includes a silicon nitride layer 12 on which discrete sections of photoresist pattern are formed through the use of photolithography. The photoresist pattern is then thermally reflowed to produce rounded discrete photoresist sections 14. The ladder etching process sequence is then carried out to produce ladder structures 12a as shown in FIG. 1B. After an ashing process for removing the remainder of the photoresist, a chemical downstream etching (CDE) process is employed to smooth the surface of the ladder structures 12a till curved microlenses 12b are created on the substrate 10 as shown in FIG. 1C. This ladder etching process sequences, however, only provides a lens height of 2~6K Angstroms, causing a problem of insufficient curvature. If the amount of photoresist pull back and the ladder height are altered for controlling thickness and slope of the microlens to reach a lens height of more than 6K Angstroms, an undesired UFO-shaped microlens 12c will occur as depicted in FIG. 1D. Also, the remainder of the photoresist on the ladder profile is not uniform, and thereby the conventional microlens structure usually accompanies a roughness issue. In addition, a unique tool is requested for the CDE process, which needs long process time and has low throughput, causing problems in the mass production.

Accordingly, a novel method is needed for the image device fabrication to produce a microlens array with desired curvature, height and profile by using a simple etching process.

SUMMARY OF THE INVENTION

Embodiments of the present invention include hemi-spherical structures and methods of fabricating the same, which use a support structure to control curvature, height and profile of the hemi-spherical structures.

In one aspect, the present invention provides a method of fabricating hemi-spherical structures as follows. A first layer is formed on a substrate, and then patterned as a plurality of support structures. The support structure is a pillar region or a ladder-shaped region. A second layer is formed on the support structures. By performing an etch process, the second layer is shaped into a plurality of hemi-spherical film regions over the support structures respectively. Each of the hemi-spherical film regions in a position corresponding to each of the support structures serves as a hemi-spherical structure.

In another aspect, the present invention provides a device having a plurality of pillar regions on a substrate, and a pattern layer on the pillar regions and the substrate. The pattern layer has a plurality of hemi-spherical film regions on the pillar regions respectively. Each of the hemi-spherical film regions in a position corresponding to each of the pillar regions serves as a hemi-spherical structure.

In another aspect, the present invention provides a device having a plurality of ladder-shaped regions on a substrate, and a pattern layer on the ladder-shaped regions and the substrate. The pattern layer has a plurality of hemi-spherical film regions on the ladder-shaped regions respectively. Each of the hemi-spherical film regions in a position corresponding to each of the ladder-shaped regions serves as a hemi-spherical structure.

BRIEF DESCRIPTION OF THE DRAWINGS

The aforementioned objects, features and advantages of this invention will become apparent by referring to the following detailed description of the preferred embodiments with reference to the accompanying drawings, wherein.

DETAILED DESCRIPTION OF ILLUSTRATIVE EMBODIMENTS

Figure 1A:
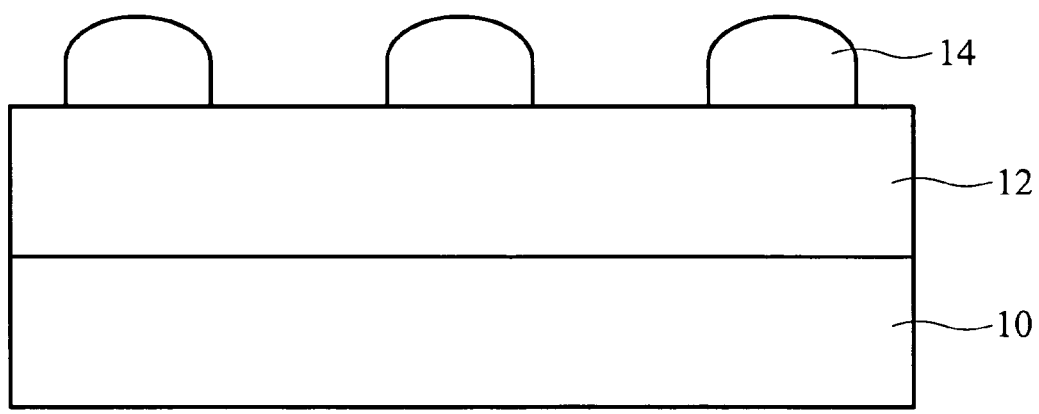
FIGS. 1A to 1D are cross-sectional diagrams illustrating conventional ladder etching process sequences for forming a microlens array.
Figure 1B:
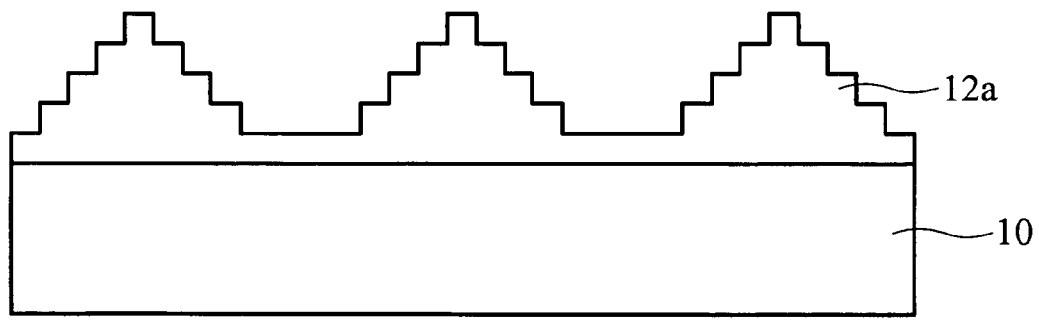
Figure 1C:
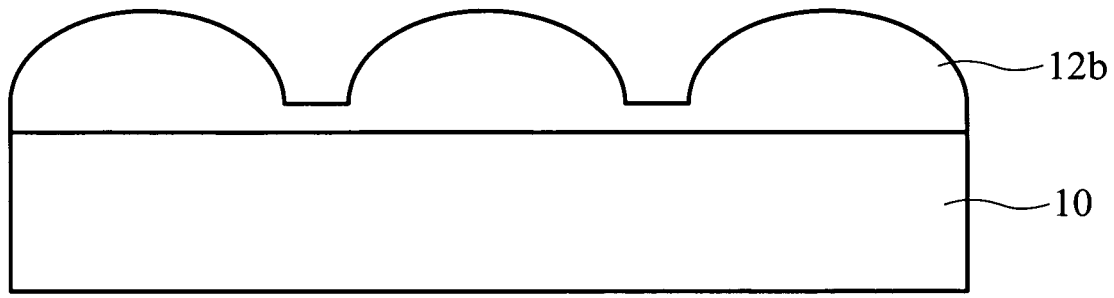
Figure 1D:
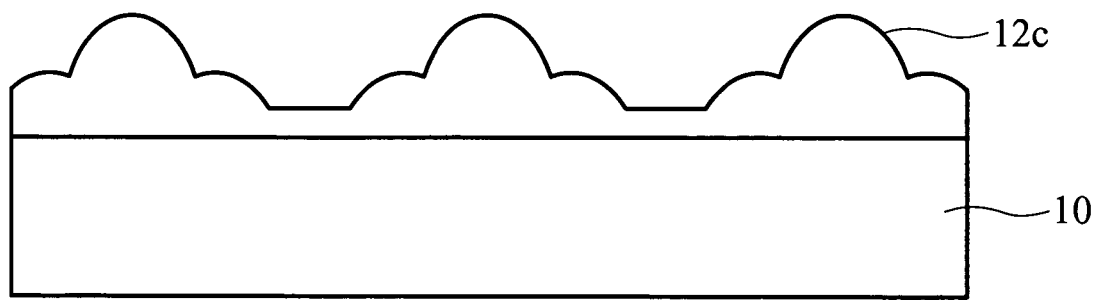

Embodiments of the present invention provide methods for fabricating hemi-spherical structures for use in optical information processing system, optical communication, optical pickup, optical measurement, and solid-sate image device applications. The hemi-spherical structure fabrication also adopts the Micro Electro-Mechanical System (MEMS) technology based upon the semiconductor processing to realize precision machining and more advantageous aspects in mass production. The inventive method can well control curvature, height and profile of the hemi-spherical structures to overcome the aforementioned problems of the conventional method through the use of a ladder etching process and a CDE process. Particularly, the present invention provides a hemi-spherical structure formed of inorganic or organic materials, which employs a support structure (e.g., a pillar region or a ladder-shaped region) under a hemi-spherical film region to control the height and curvature of the hemi-spherical structure. Also, during an etch-back process for curving and smoothing the hemi-spherical film region, a planarized region is created between two adjacent hemi-spherical film regions. For microlens applications, the hemi-spherical structure may employ the same material for forming the support structure and the hemi-spherical film region. For MEMS applications, the hemi-spherical structure may employ the same material or different materials for forming the support structure and the hemi-spherical film region.

Reference will now be made in detail to the present embodiments, examples of which are illustrated in the accompanying drawings. Wherever possible, the same reference numbers are used in the drawings and the description to refer to the same or like parts. In the drawings, the shape and thickness of one embodiment may be exaggerated for clarity and convenience. This description will be directed in particular to elements forming part of, or cooperating more directly with, apparatus in accordance with the present invention. It is to be understood that elements not specifically shown or described may take various forms well known to those skilled in the art. Further, when a layer is referred to as being on another layer or "on" a substrate, it may be directly on the other layer or on the substrate, or intervening layers may also be present.

Figure 2A:
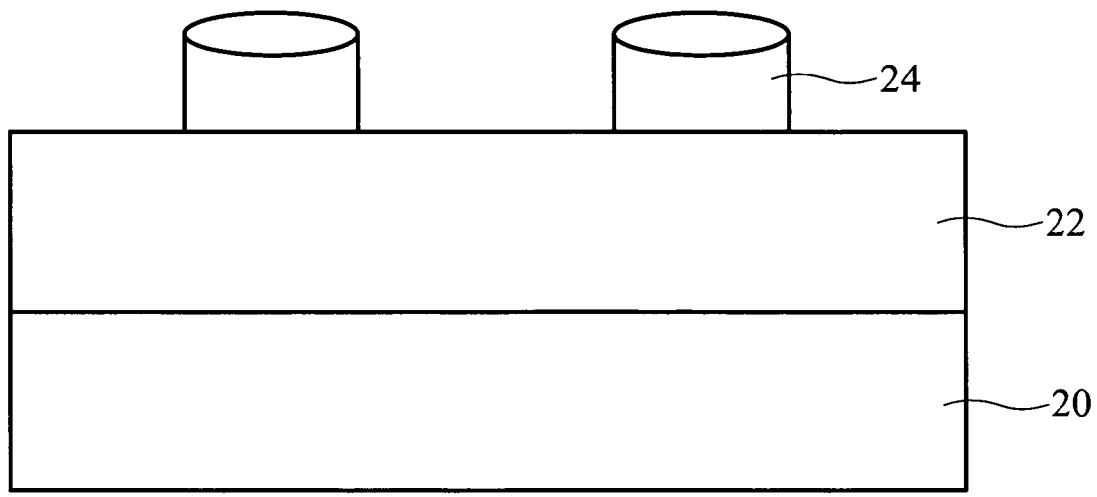
FIGS. 2A to 2D are cross-sectional diagrams illustrating an exemplary embodiment of a method of forming hemi-spherical structures.

Herein, cross-sectional diagrams of FIGS. 2A to 2D illustrate an exemplary embodiment of a method of forming hemi-spherical structures. In FIG. 2A, a substrate 20 is provided with a first layer 22 deposited thereon, for example deposited on a planarized surface of the substrate 20. For image device fabrication, the substrate 20 is a silicon substrate, on which field oxide regions, photodiodes, inter-metal dielectric layers, metal wires, passivation layers, planarization layers, and color filters are fabricated and omitted in the Figures. The first layer 22 may be an inorganic material or an organic material. The first layer 22 may have a thickness, but is not limited to, about 300~10000000 Angstroms. The thickness of the first layer 22 is chosen specifically for the scaling requirements of the hemi-spherical structures and may vary depending on future-developed processes. In one embodiment, the first layer 22 is a silicon nitride layer, for example, formed through any of a variety of deposition techniques, including LPCVD (low-pressure chemical vapor deposition), APCVD (atmospheric-pressure chemical vapor deposition), PECVD (plasma-enhanced chemical vapor deposition), PVD (physical vapor deposition), sputtering, and future-developed deposition procedures. It is to be appreciated other well-known inorganic dielectric material such as silicon oxide, oxide-based dielectrics, nitride-based dielectrics and combinations thereof for forming the first layer 22. In one embodiment, the first layer 22 may be a photoresist layer, for example, formed through spin-coating or other advanced coating/depositing technology. It is to be appreciated other well-known organic dielectric material such as thermoplastic materials or other photoresist-type materials performing different refractivity.

Next, a plurality of discrete masking patterns 24 is provided on the first layer 22. For example, the masking patterns 24 are formed of photoresist defined by a photolithography process including photoresist coating, soft baking, mask aligning, exposing, post-exposure baking, developing photoresist and hard baking. Each of the discrete masking patterns 24 may be a cylinder-like pattern, a square pillar, a rectangular pillar or the like.

Figure 2B:
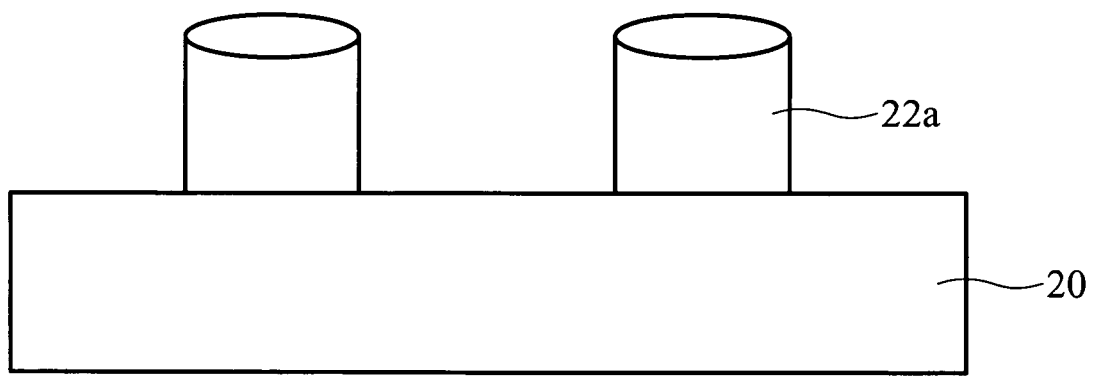

In FIG. 2B, using dry etch operation with the discrete masking patterns 24 as an etch mask, the first layer 22 is shaped into discrete pillar regions 22a. The masking patterns 24 are then removed. Each of the pillar regions 22a serves as one part of a hemi-spherical structure, and is used as a support structure 22a on which a hemi-spherical film will be formed in subsequent processes. By controlling the thickness and size of the pillar region 22a, the height of the hemi-spherical structure can be well adjusted to achieve desired high curvature. For example, the pillar region 22a may be patterned as a cylinder, a square pillar, a rectangular pillar or the like.

Figure 2C:
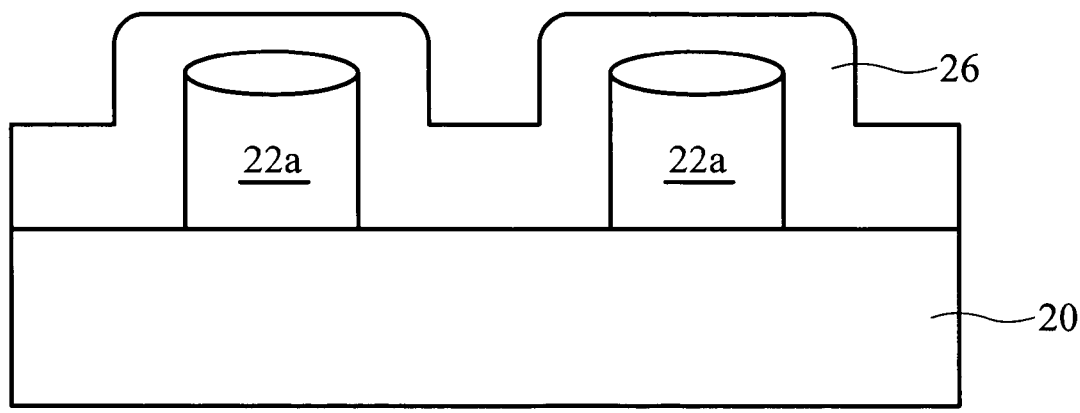

In FIG. 2C, a second layer 26 is deposited on the pillar regions 22a and the exposed portions of the substrate 20, thus covering the space between discrete pillar regions 22a and having a deposited profile substantially consistent with the topography of the exposed surfaces. The second layer 26 selected from inorganic materials or organic materials may be formed of the same material as the first layer 22 for microlens applications. Alternatively, for MEMS technology, the second layer 26 and the first layer 22 may be formed of different materials or the same material. The second layer 26 may have a thickness, but is not limited to, about 300~10000000 Angstroms. The thickness of the second layer 26 is chosen specifically for the scaling requirements of the hemi-spherical structures and may vary depending on future-developed processes. In one embodiment, the second layer 26 is a silicon nitride layer, for example, formed through any of a variety of deposition techniques, including LPCVD (low-pressure chemical vapor deposition), APCVD (atmospheric-pressure-chemical vapor deposition), PECVD (plasma-enhanced chemical vapor deposition), PVD (physical vapor deposition), sputtering, and future-developed deposition procedures. It is to be appreciated other well-known inorganic dielectric material such as silicon oxide, oxide-based dielectrics, nitride-based dielectrics and combinations thereof for forming the second layer 26. In one embodiment, the second layer 26 may be a photoresist layer, for example, formed through spin-coating or other advanced coating/depositing technology. It is to be appreciated other well-known organic material such as thermoplastic materials or other photoresist-type materials performing different refractivity.

Figure 2D:
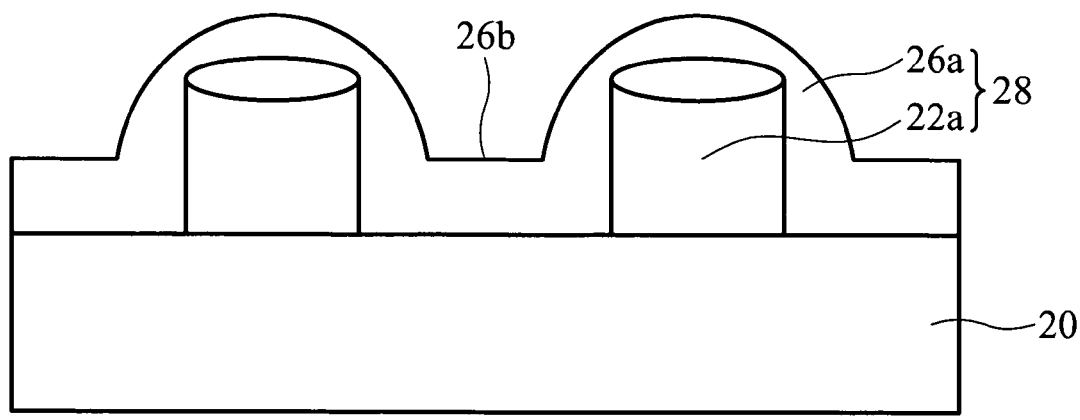

In FIG. 2D, an etch-back process is performed to pattern the second layer 26 as hemi-spherical film regions 26a over the pillar regions 22a respectively, without exposing the pillar regions 22a and the substrate 20. The etch-back process employs an dry etch process, such as RIE (Reactive Ion Etching) or other plasma etching processes, for example using F-based gas as an etchant for the silicon nitride option, to shape the second layer 26 in an anisotropically etching manner. Alternatively, the etch-back process may employs a wet etch process to shape the second layer 26. Particularly, some regions of the second layer 26 adjacent to the sidewalls of the pillar regions 22a are shaped to create curved and smooth surfaces overhanging the pillar regions 22a respectively, and another regions of the second layer 26 overlying the exposed portions of the substrate 20 is planarized. Thus, the second layer 26 disposed in a position corresponding to the pillar region 22a is finally shaped into a hemi-spherical film region 26a with a curved and smooth surface, serving as a curved layer that functions as another part of a hemi-spherical structure 28. By controlling the thickness of the second layer 26, the height of the hemi-spherical structure 28 can be further adjusted to achieve desired high curvature. Also, during this etch-back process, the hemi-spherical film regions 26a are not completely separated, and a planarized region 26b of the remainder of the second layer 26 is obtained in the space between two adjacent hemi-spherical film regions 26a for maintaining the hemi-spherical structures 28 with an intended size and preventing functional defects occurred in the hemi-spherical structures 28.

In one embodiment, when the first layer 22 is formed of an organic material, such as photoresist, the step of providing discrete masking patterns 24 as shown in FIG. 2A can be omitted. For example, the first layer 22 provided on the substrate 20 can be directly patterned as discrete pillar regions 22a by a photolithography process including photoresist coating, soft baking, mask aligning, exposing, post-exposure baking, developing photoresist and hard baking. This can simplify the hemi-spherical fabrication procedure and save process costs.

Accordingly, the hemi-spherical structures 28 are completed by using simple patterning and etch-back processes for forming the pillar regions 22a and the hemi-spherical film regions 26a. Compared with the conventional ladder etch process and CDE process, the inventive method has higher throughput and is more easily implemented in the mass production. Also, by controlling the height of the pillar region 22a and/or the thickness of the second layer 26, the inventive hemi-spherical structure 28 can achieve a desired height more than 6K Angstroms, resulting in a desired high curvature.

Figure 3A:
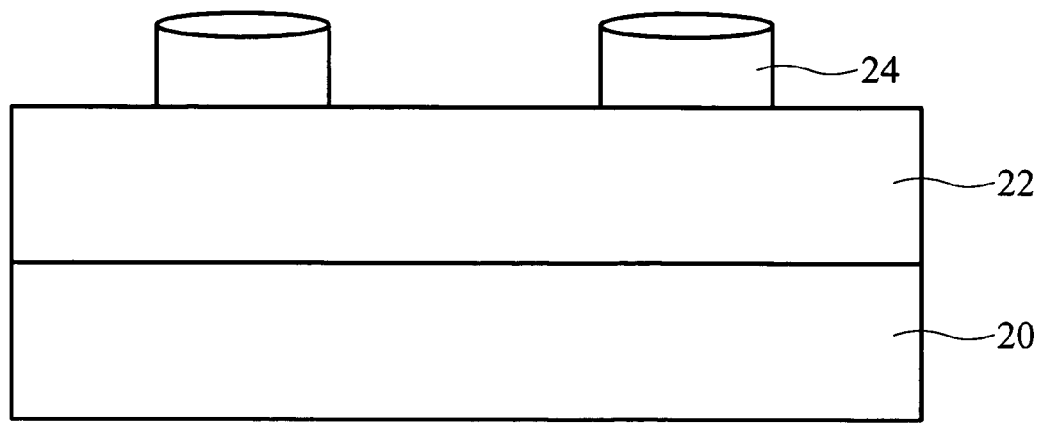
FIGS. 3A to 3D are cross-sectional diagrams illustrating another exemplary embodiment of a method of forming hemi-spherical structures.
Figure 3B:
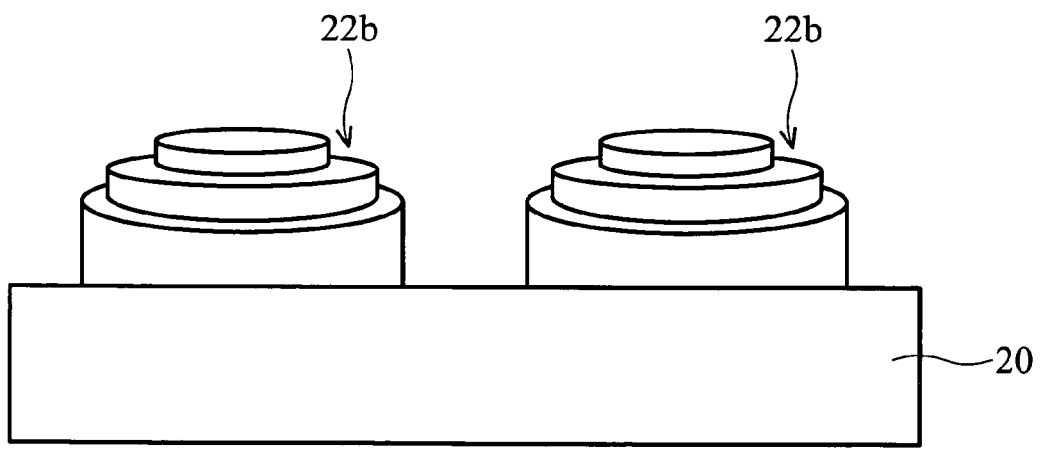

In addition to the pillar regions 22a as shown in FIG. 2B, another exemplary embodiment of the present invention employs a ladder-shaped region as the support structure under the hemi-spherical film region 26a. Cross-sectional diagrams of FIGS. 3A to 3D illustrate another exemplary embodiment of a method of forming hemi-spherical structures. Explanation of the same or similar portions to the description in FIGS. 2A-2D is omitted herein. In FIG. 3A, a substrate 20 is provided with a first layer 22 and a plurality of discrete masking patterns 24. Each of the discrete masking patterns 24 may be a cylinder-like pattern, a square pillar, a rectangular pillar or the like. In FIG. 3B, a ladder etching process sequence is then carried out and may include a succession of alternating etching steps used to alternately laterally remove the edges of the discrete masking patterns 24 and anisotropically etch the first layer 22 downward. The alternating etching steps may include a downward (anisotropic) etching step and a photoresist pull back step together, which may be considered a unit process for forming one ladder, thus producing discrete ladder-shaped regions 22b. Each of the ladder-shaped region 22b is a stack structure composed of two ladder-shaped plates or more, in which the lower ladder-shaped plate is larger and thicker than the upper ladder-shaped plates. The masking patterns 24 are then removed. Each of the ladder-shaped regions 22b serves as one part of a hemi-spherical structure, and is used as a support structure 22b on which a hemispherical film will be formed in subsequent processes. By controlling the thickness and size of the ladder-shaped plates in the ladder-shaped region 22b, the height of the hemi-spherical structure can be well adjusted to achieve desired high curvature.

Figure 3C:
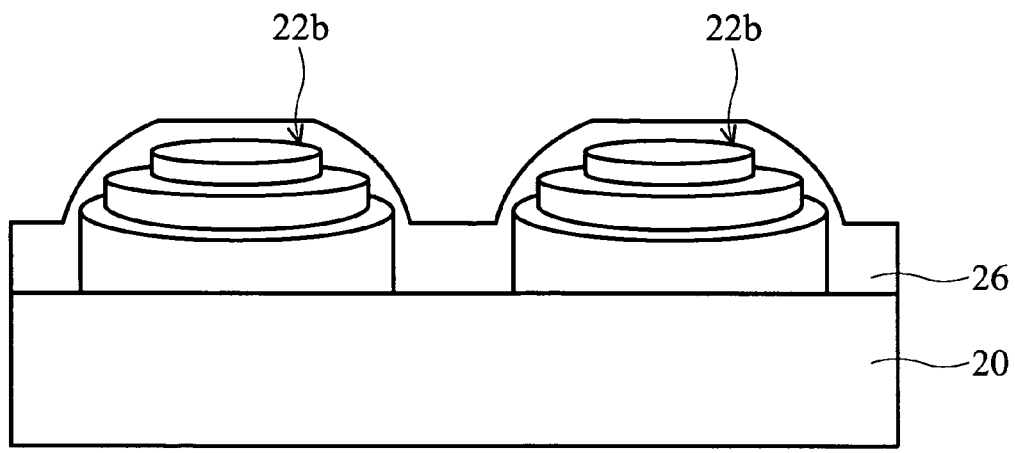
Figure 3D:
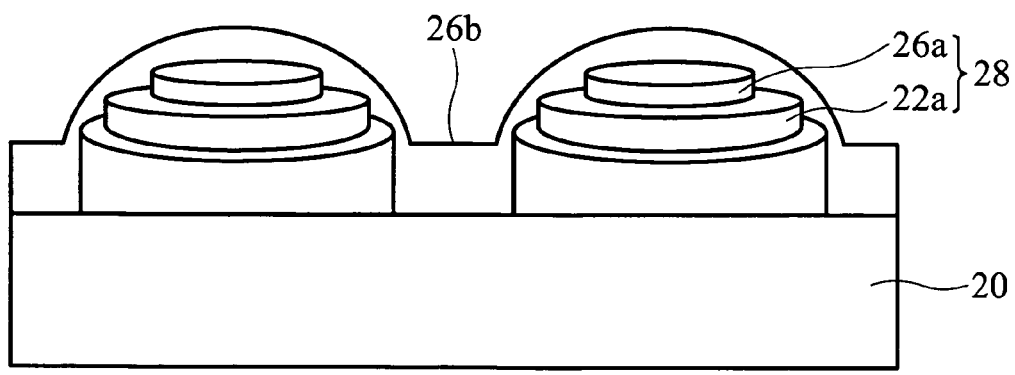

In FIG. 3C, a second layer 26 is deposited on the ladder-shaped regions 22b and the exposed portions of the substrate 20, thus covering the space between discrete ladder-shaped regions 22b and having a deposited profile substantially consistent with the topography of the exposed surfaces. In FIG. 3D, an etch-back process is performed to pattern the second layer 26 as hemi-spherical film regions 26a over the ladder-shaped regions 22b respectively, without exposing the ladder-shaped regions 22b and the substrate 20. Particularly, some regions of the second layer 26 adjacent to the ladder profile of the ladder-shaped regions 22b are shaped to create curved and smooth surfaces overhanging the ladder-shaped regions 22b respectively, and another regions of the second layer 26 overlying the exposed portions of the substrate 20 is planarized. Thus, the second layer 26 disposed in a position corresponding to the ladder-shaped regions 22b is finally shaped into a hemi-spherical film region 26a with a curved and smooth surface, serving as a curved layer that functions as another part of a hemi-spherical structure 28. Also, during this etch-back process, the hemi-spherical film regions 26a are not completely separated, and a planarized region 26b of the remainder of the second layer 26 is obtained in the space between two adjacent ladder-shaped regions 22b for maintaining the hemi-spherical structures 28 with an intended size and preventing functional defects occurred in the hemi-spherical structures 28.

Although the present invention has been described in its preferred embodiments, it is not intended to limit the invention to the precise embodiments disclosed herein. Those skilled in this technology can still make various alterations and modifications without departing from the scope and spirit of this invention. Therefore, the scope of the present invention shall be defined and protected by the following claims and their equivalents.

What is claimed is:

1. A device, comprising:

a plurality of pillar regions on a substrate; and a pattern layer on said pillar regions and said substrate, wherein said pattern layer comprises a plurality of hemi-spherical film regions on said pillar regions respectively, and each of said hemi-spherical film regions serve as a microlens structure;

wherein, a single pillar region only corresponds to a single hemi-spherical film region to serve as a hemi-spherical structure.

2. The device of claim 1, wherein said pattern layer comprises a plurality of planarized regions on said substrate between said hemi-spherical film regions.

3. The device of claim 1, wherein said pillar region is formed of silicon nitride, silicon oxide, or photoresist.

4. The device of claim 1, wherein said pattern layer is a silicon nitride layer, a silicon oxide layer or a photoresist layer.

5. The device of claim 1, wherein each of said hemi-spherical film regions serves as a microlens structure of an image device.

6. A device, comprising:

a plurality of ladder-shaped regions on a substrate; and a pattern layer on said ladder-shaped regions and said substrate, wherein said pattern layer comprises a plurality of hemi-spherical film regions on said ladder-shaped regions respectively, and each of said hemi-spherical film regions serve as a microlens structure;

wherein, a single ladder-shaped region only corresponds to a single hemi-spherical film region to serve as a hemi-spherical structure.

7. The device of claim 6, wherein said pattern layer comprises a plurality of planarized regions on said substrate between said hemi-spherical film regions.

8. The image device of claim 6, wherein said ladder-shaped regions is formed of silicon nitride, silicon oxide, or photoresist.

9. The device of claim 6, wherein said pattern layer is a silicon nitride layer, a silicon oxide layer or a photoresist layer.

10. The device of claim 6, wherein each of said hemispherical film regions serves as a micro lens structure of an image device.

* * * * *